INVENTOR
PETER D. GEORGE
BY
Morse, Altman + Oates
ATTORNEYS

Oct. 21, 1969 P. D. GEORGE 3,473,207
MODULAR LATHES
Filed Jan. 23, 1967 4 Sheets-Sheet 2

INVENTOR
PETER D. GEORGE
BY
Morse, Altman & Oates
ATTORNEYS

United States Patent Office 3,473,207
Patented Oct. 21, 1969

3,473,207
MODULAR LATHES
Peter D. George, 156 Crabtree Road,
Quincy, Mass. 02171
Continuation-in-part of application Ser. No. 367,720,
May 15, 1964. This application Jan. 23, 1967, Ser.
No. 611,013
Int. Cl. B23b 3/16, 7/04
U.S. Cl. 29—45        7 Claims

ABSTRACT OF THE DISCLOSURE

Indexing mechanism is provided for the turret head of a lathe. The mechanism includes a lever arm which, when actuated, causes movement of a carriage to and away from the work and simultaneously actuates the turret head so as to bring different tools into cutting position. Spherical elements connected to the turret head cooperate with a pivoted wedge which locks the turret head in a selected angular position. A variable stop unit is also provided for controlling the depth of successive cuts made by tools mounted on the head.

---

This application is a continuation-in-part of my U.S. application Ser. No. 367,720, filed May 15, 1964 and now abandoned.

This invention relates generally to lathe machinery and more particularly is directed towards a lathe base support and driving head in cooperation with a variety of interchangeable modules adapted to perform selected machining operations. This invention is also directed towards improvements in lathe components.

A lathe generically defines a machine adapted to remove metal from a work-piece by gripping it securely in a clamping device and rotating it under power against a suitable cutting tool. Lathes are able to perform a number of machining operations such as facing, boring and threading, and, depending upon the design of the machine, these operations may be carried out under manual, semi-automatic or completly automatic control. While machines of this type generally are quite versatile as a class, a specific lathe unit is relatively restricted as to its range of operations. For this reason, machine shops normally require several individual lathe machines, each adapted to perform certain machining operations for which each machine is particularly designed. Since each machine is a relatively expensive piece of equipment, a sizeable capital outlay is required to properly outfit a machine shop.

Accordingly, it is a general object of the present invention to provide improvements in lathe machines.

Another object of this invention is to provide a basic lathe unit adapted to accommodate a variety of interchangeable modules for performing a variety of different machining operations.

Still another object of this invention is to provide a lathe machine which is readily convertible from one mode of operation to another.

A still further object of this invention is to provide a lathe machine with cooperating modules which may function on a manual, semi-automatic or completely automatic basis.

More particularly, this invention features a lathe comprising a basic driving head and cylindrical ways of hardened metal on which are selectively mounted interchangeable modules each adapted to perform one or more selected operations such as threading, boring or the like. Certain ones of the modules may be programmed to cycle automatically and perform selected predetermined operations on a completely automatic basis. Other modules may be amployed for semi-automatic operations while further modules may be operated manually for use in producing individual parts not suitable for automatic production.

However, these and other features of the invention along with further objects and advantages thereof, will become more fully apparent from the following detailed description of a preferred embodiment of the invention, with reference being made to the accompanying drawings, in which.

Figure 1:
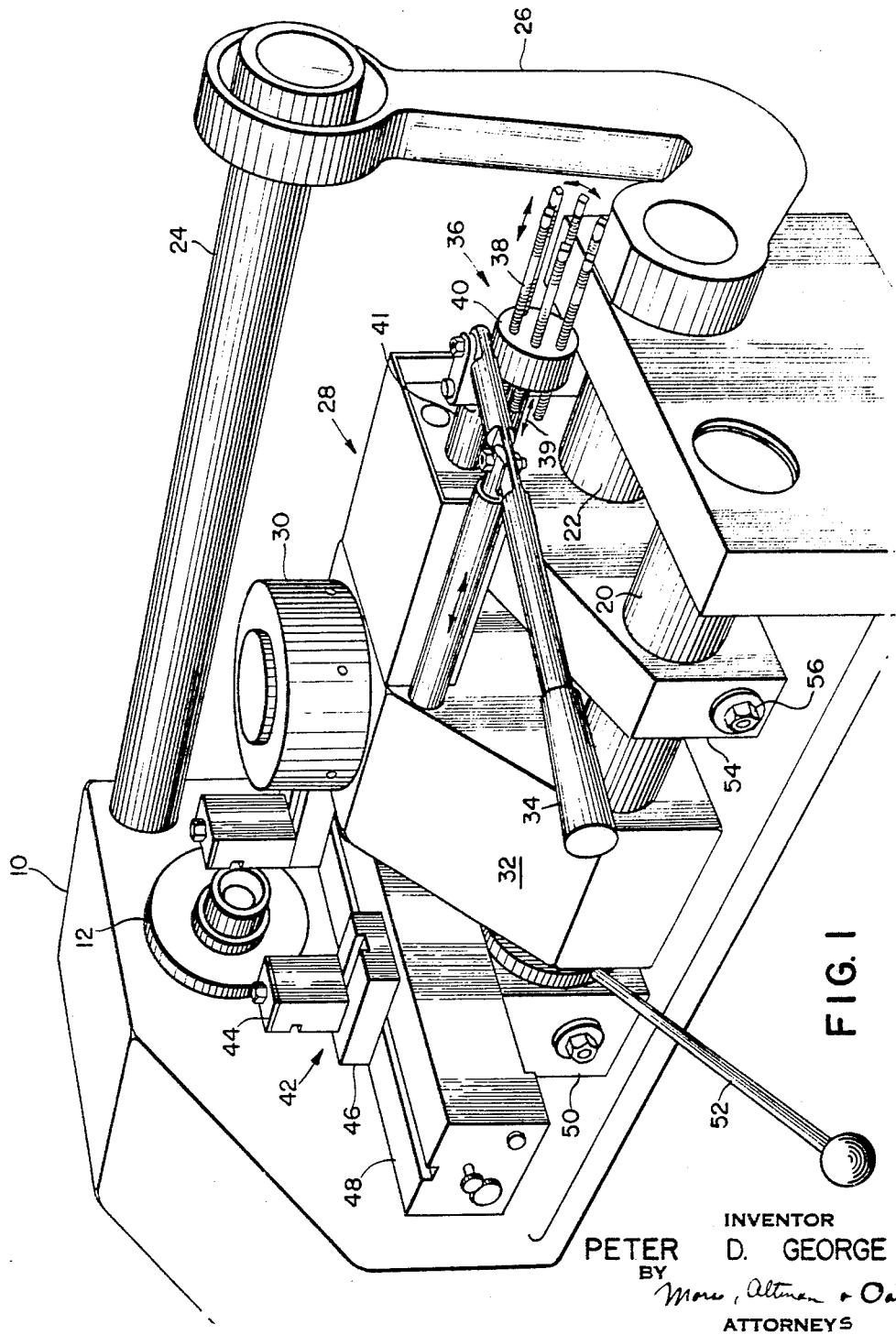
FIG. 1 is a view in perspective of a turret module mounted on a lathe base.

Referring now to FIG. 1 of the drawings, there is shown a turret module 28 mounted on ways 20 and 22 of a base unit 10. The turret module includes a rotatable turret head 30 mounted on a carriage 32 adapted to accommodate a plurality of radially extending tools. The turret head may be indexed about a vertical axis to bring a selected tool into alignment with spindle 12 and then be advanced into and out of cutting position by means of a lever 34. The depth of the cut made by the actuation of the lever may be selectively controlled by means of a dial stop mechanism 36. This mechanism includes a plurality of threaded stop rods 38 mounted on a head 40 carried by a rotor 39 adapted to reciprocate axially with its carriage 32 and index angularly in single increments with each actuation of the lever 34. A stop is provided by the flat end face of a fixed rod 41 in register with one of the stop rods 38. Each of the rods will be set for a particular depth and by advancing the head 40 borings of different depths may be made each time the lever 34 is actuated.

Shown also in conjunction with the turret module is a cross-slide module 42 for mounting selected cutting tools. This module includes tool blocks 44 mounted on a longitudinal block 46 which in turn is mounted on a slide 48. The slide 48 is mounted on a carriage 50 which rides on the ways 20 and 22. The carriage and slide are joined by rack and pinion arrangement with the pinion being operated by a lever 52 whereby the slide may be reciprocated through a horizontal plane laterally of the machine to make outside cuts on the workpiece in conjunction with the boring operations which may be carried out by the tools in the turret head 30.

Figure 2:
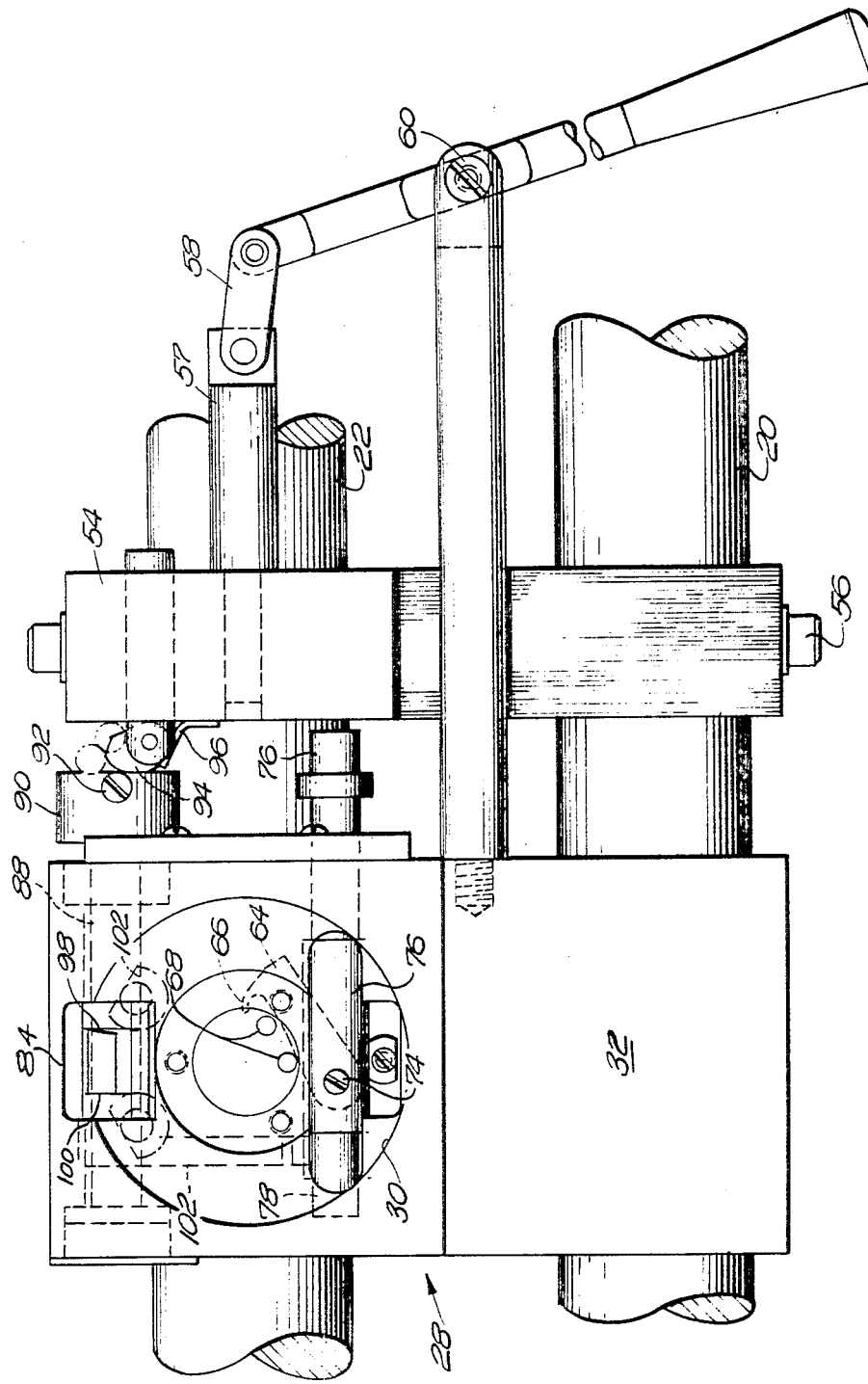
FIG. 2 is a fragmentary sectional plan view of the turret mechanism.
Figure 3:
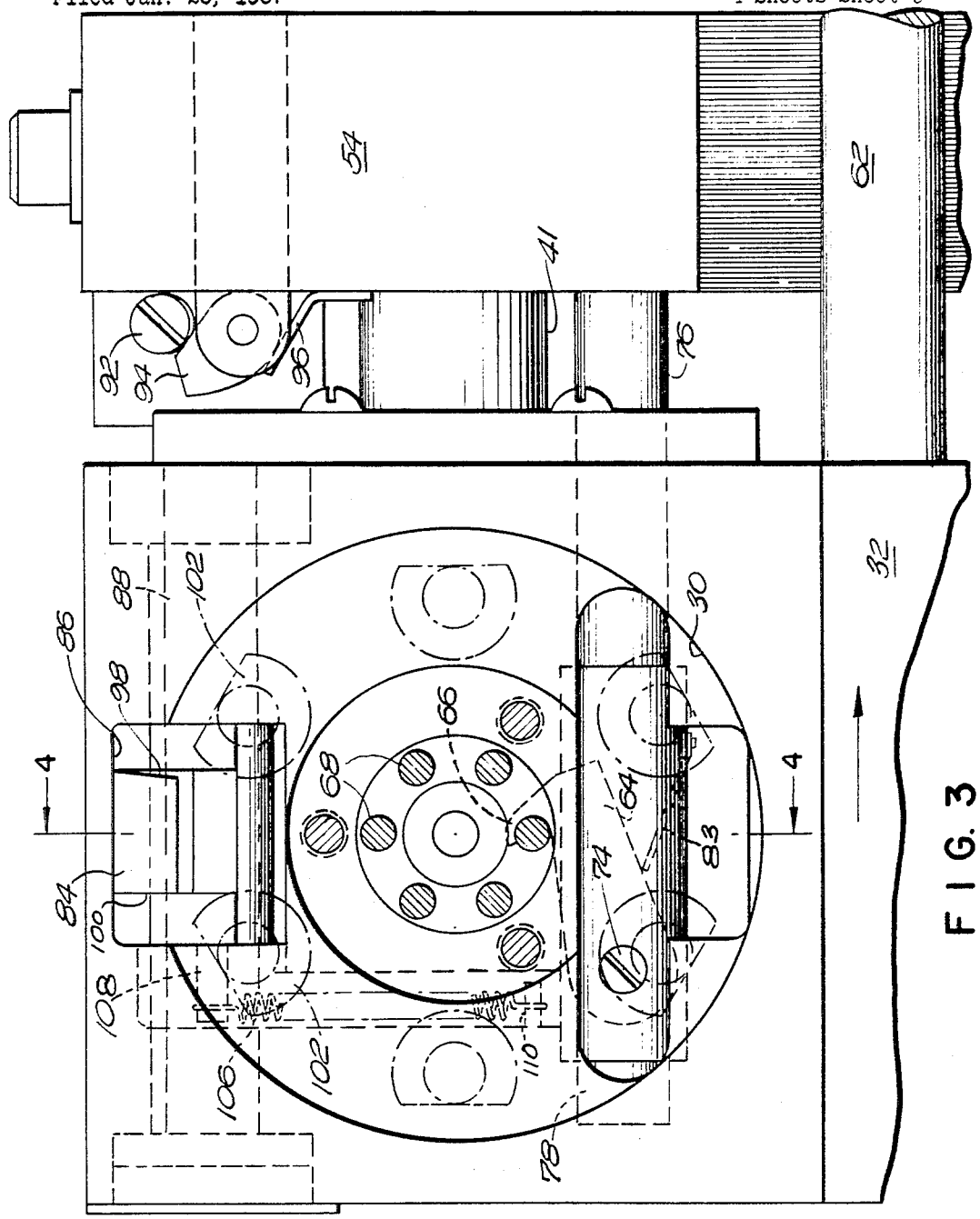
FIG. 3 is a view similar to FIG. 2 but on an enlarged scale and showing the components in a different functioning position, and, FIG. 4 is a cross-sectional view taken along the line 4—4 of FIG. 3.
Figure 4:
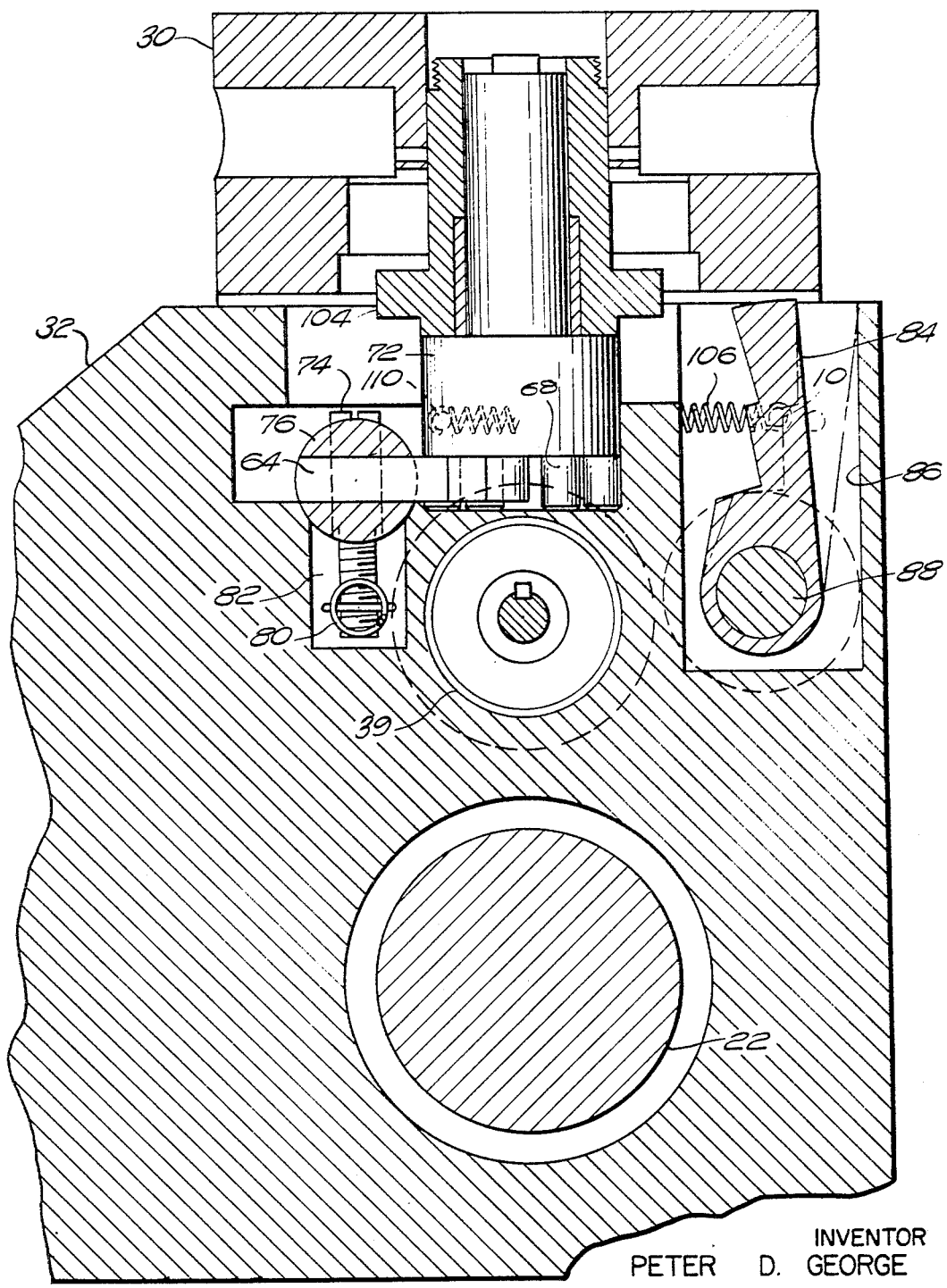

Referring more particularly to the turret mechanism, reference will be made particularly to FIGS. 2, 3 and 4 which show in detail the construction of the turret actuating mechanism. The assembly includes the movable carriage 32 and a fixed standard 54 secured to the ways 20 and 22 by means of locking bolts 56. The fixed rod 41 extends to the right-hand side of the standard 54 as seen in FIG. 2 and carries an articulated link 58 which is also connected to the end of the lever 34. Towards its mid-portion the lever 34 is pivoted by pin 60 to a connecting rod 62, the left-hand end of which drivingly engages the carriage 32. It will thus be understood that by manipulating the lever 34 clockwise to the left, as viewed in FIG. 2, the carriage 32 will move to the left, and, conversely, by shifting the lever 34 to the right or counterclockwise the carriage 32 will be pulled to the right.

Movement of the carriage 32 by operation of the lever 34 to the left causes the turret head 30 to index clockwise about a vertical axis as seen in FIG. 2. This clockwise movement of the turret is accomplished by means of a latching mechanism which includes a latch 64 having a hook portion 66 adapted to engage one of a number of pins 68 depending from the lower end of a hub 70 drivingly engaging the turret head 30, as best shown in FIG. 4. The latch 64 is pivoted by pin 74 to a slide 76 mounted in the carriage block within a chamber 78. The slide 76 has its right-hand end extending out through the side of the carriage block where it is adapted to bear against the side face of the fixed standard 54 when the carriage 32 is brought to the right upon manipulation of the lever 34. The slide 76 is normally urged to the right by means of a spring 80 mounted in a chamber 82 below the slide with the left-hand end of the spring engaging the lower end of the pin 74 while the right-hand end of the spring is secured to the carriage block.

Assuming that the operator moves the lever 34 to the right, the carriage 32 will also move to the right and this will bring the right-hand end of the slide 76 up against the face of the fixed standard 54. By continuing to pull the carriage 32 to the right the slide 76, now being held stationary in relation to the moving carriage 32, will pull the latch 64 against one of the pins 68 causing the turret head to index in a clockwise direction. The turret head will continue to index until the slide 76 is brought to its extreme left-hand position at which point the carriage 32 will be brought to a stop and the turret head will be fully indexed. When the carriage 32 is again shifted to the left by the lever 34, the latch 64 will disengage from the pin 68 with which it had been engaged and will move with the slide 76 in a right-hand direction biasing outwardly under the force of a leaf spring 83 to engage the next pin 68 in preparation for the next cycle of operation. The slide 76 by reason of the spring 80 will be carried back to its normal right-hand position as the carriage 32 moves to the left.

In order to lock the turret head at each indexed position, a pivoted wedge 84 is mounted to the carriage block in a chamber 86 on the opposite side of the hub 72. The wedge 84 is fastened securely to a rotatable shaft 88 extending parallel to the slide 76 and having an enlarged end portion 90 extending out from the right-hand side of the carriage 32. The hub 90 carries a boss 92 which is adapted to engage a pivoted cam 94 when the carriage 32, together with the shaft 88 and boss 92 are moved to the right. Movement of the boss 92 against the curved face of the cam 94 will cause the shaft 88 to rotate clockwise as seen in FIG. 4 to a position indicated by dotted lines in FIGS. 2 and 4. The boss thus rides to the side and then to a position behind the cam 94 at its original angular position. The cam 94 is biased clockwise, as viewed in FIG. 2, by means of a contoured leaf spring 96 one end of which is fixed to the standard 54 while the free end bears against the cam urging it in a clockwise direction. When the carriage 32 is subsequently shifted to the left, this will pull the shaft 88 and its boss 92 to the left. The boss will disengage from the cam with the cam pivoting counterclockwise sufficiently to allow the boss 92 to pass. Once the boss 92 is cleared, the cam 94 will snap back to its original position.

Angular movement of the shaft 88, under the cooperating action of the boss and cam 92 and 94, will cause the wedge 84 to move to and away from the turret head from locked to unlocked positions. When the wedge is in a locking position, the shaft 88 and the wedge 84 are in their extreme counterclockwise position as viewed in FIG. 4, the wedge being located inwardly towards the hub 72. As best shown in FIG. 2, the wedge 84 is formed with working surfaces 98 and 100 one being straight while the other is inclined about 5° and which are adapted to bear against opposing curved faces of an adjacent pair of spaced spherical elements 102. The balled elements, which typically are six in number, are evenly spaced about the hub 72 and depend from a shoulder 104 formed above the hub 72. It will be understood that when the wedge 84 is in a locking position, the working faces 98 and 100 will wedge in between any pair of adjacent balls, firmly locking the turret head in position. The wedge is normally biased into a locking position by means of a spring 106 one end of which engages the wedge by a pin 108 while the opposite end is fastened to the carriage block by a pin 110.

It will be understood that the various parts are designed so that just before the turret head is indexed by the latch, the wedge will be moved out of locking engagement with the balled elements and when indexing has been completed, the wedge will move back into locking engagement in proper timed sequence.

Indexing of the turret head also causes indexing of the variable stop unit 40 through means of beveled gears (not shown) in mesh between the shaft 39 and the vertical shaft for the turret head. Thus each actuation of the lever 34 not only conducts the head 30 to a new angular position but also indexes the stop unit 40 which controls the depth of the cut.

While the invention is described with particular reference to the illustrated embodiment, it will be understood that numerous modifications thereto will appear to those skilled in the art. Also it will be understood that the above description and the accompanying drawings should be taken as illustrative of the invention and not in a limiting sense.

Having thus described the invention, what I claim and desire to obtain by Letters Patent of the United States is:

1. An indexing mechanism for turret heads and the like, comprising
   (a) a rotatable member drivingly connected to said head,
   (b) a plurality of spherical elements evenly spaced about said member,
   (c) a wedge pivoted about an axis normal to the axis of said member and movable into and out of locking engagement with said elements,
   (d) said member being formed with a plurality of hook-engaging portions evenly spaced thereabouts,
   (e) a slide mounted adjacent said member and movable along a path normal to the axis of said member,
   (f) a hook pivoted to said slide and adapted to engage said hook-engaging portions, and,
   (g) means for moving said slide along said path to index said member and to pivot said wedge out of engagement with said elements while said member is indexing.

2. An indexing mechanism according to claim 1 wherein said wedge moving means includes a shaft supporting said wedge, a boss extending radially from said shaft and a cam adapted to engage said boss to thereby rotate said shaft and pivot said wedge.

3. An indexing mechanism according to claim 2 including spring means normally urging said wedge into locking engagement with said elements.

4. An indexing mechanism according to claim 1 including a spring normally urging said slide in one direction along said path.

5. A turret mechanism for lathes and the like, comprising
   (a) a movable carriage,
   (b) a rotatable turret mounted to said carriage,
   (c) a fixed standard mounted adjacent said carriage,
   (d) an arm pivotally mounted to said standard and drivingly connected to said carriage whereby movement of said arm reciprocates said carriage to and away from said standard,
   (e) means responsive to movement of said carriage for indexing said turret,
   (f) a rotatable member drivingly connected to said turret and movable with said carriage,
   (g) a plurality of stop rods of different lengths mounted to said member for selective engagement with said standard,
   (h) indexing of said member bringing each stop rod successively into position to engage said standard upon movement of said carriage,
   (i) said turret indexing means including a plurality of spherical elements carried by said turret, a wedge pivoted about an axis normal to the turret axis for movement into and out of locking engagement between an adjacent pair of elements, a plurality of pins mounted concentrically to said rotatable member, a latch engagable with said pins, and means responsive to movement of said carriage for cooperatively moving said latch to index said turret and pivot said wedge.

6. A turret mechanism according to claim 5 wherein said responsive means includes a slide to which said latch is pivoted, said slide extending generally tangential to said turret and parallel to the path of said carriage, said slide adapted to engage said standard upon movement of said carriage.

7. A turret mechanism according to claim 5 including a shaft supporting said wedge and extending parallel to the path of said carriage, a boss extending radially of said shaft, a cam pivotally mounted to said standard in position to engage said boss upon movement of said carriage whereby said shaft and wedge will be pivoted about said shaft axis.

References Cited

UNITED STATES PATENTS

| | | | |
|---|---|---|---|
| 1,443,965 | 2/1923 | Parsons | 29—45 XR |
| 2,783,526 | 3/1957 | Johnson | 29—45 |
| 3,184,996 | 5/1965 | Catlin | 74—822 |

LEONIDAS VLACHOS, Primary Examiner

U.S. Cl. X.R.

74—813, 816; 82—34